US009473744B2

(12) United States Patent
Lee et al.

(10) Patent No.: US 9,473,744 B2
(45) Date of Patent: *Oct. 18, 2016

(54) METHOD AND APPARATUS FOR PROVIDING USER INPUT BACK CHANNEL IN AUDIO/VIDEO SYSTEM

(71) Applicant: SAMSUNG ELECTRONICS CO., LTD., Suwon-si (KR)

(72) Inventors: Jae-min Lee, Suwom-si (KR); Il-ju Na, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,442

(22) Filed: Jul. 16, 2015

(65) Prior Publication Data

US 2015/0326654 A1 Nov. 12, 2015

Related U.S. Application Data

(63) Continuation of application No. 12/917,684, filed on Nov. 2, 2010.

(60) Provisional application No. 61/257,186, filed on Nov. 2, 2009.

(30) Foreign Application Priority Data

Oct. 19, 2010 (KR) ........................ 10-2010-0101872

(51) Int. Cl.
*H04N 21/436* (2011.01)
*H04N 21/422* (2011.01)
(Continued)

(52) U.S. Cl.
CPC ...... *H04N 7/17318* (2013.01); *H04L 65/4092* (2013.01); *H04L 65/60* (2013.01);
(Continued)

(58) Field of Classification Search
CPC ............... H04N 21/43637; H04N 21/42207; H04N 21/42204; H04N 21/632; H04N 21/43615; H04N 21/439; H04L 65/608; H04L 65/4092; H04L 67/104; H04L 29/06027
See application file for complete search history.

(56) References Cited

U.S. PATENT DOCUMENTS

2004/0203374 A1 10/2004 Zilliacus
2005/0108760 A1 5/2005 Iwamura
(Continued)

FOREIGN PATENT DOCUMENTS

KR 10-2005-0059268 A 6/2005
KR 10-2005-0060945 A 6/2005
KR 10-2008-0029415 A 4/2008

OTHER PUBLICATIONS

Hellstrom, G., et al., "RTP Payload for Text Conversation", Standards Track, Network Working Group, The Internet Society, Jun. 2005, pp. 1-20.
(Continued)

*Primary Examiner* — Benjamin R Bruckart
*Assistant Examiner* — Aklil Tesfaye
(74) *Attorney, Agent, or Firm* — Sughrue Mion, PLLC

(57) ABSTRACT

A method and apparatus for providing a user input back channel (UIBC) in an audio/video (AV) source device and an AV sink device communicating according to a wireless fidelity (Wi-Fi) display (WFD) standard is provided. The method includes: setting up an AV control session and an AV data session between the AV source devices according to the WFD standards; enabling the UIBC from the AV sink device to the AV source device by using the AV control session; and transmitting a user input from the AV sink device to the AV source device through the UIBC.

29 Claims, 13 Drawing Sheets

(51) Int. Cl.
  *H04N 21/63* (2011.01)
  *H04N 21/439* (2011.01)
  *H04N 7/173* (2011.01)
  *H04L 29/08* (2006.01)
  *H04L 29/06* (2006.01)
  *H04N 21/41* (2011.01)
  *H04N 21/643* (2011.01)

(52) U.S. Cl.
  CPC .......... *H04L 65/608* (2013.01); *H04L 67/104* (2013.01); *H04N 21/4122* (2013.01); *H04N 21/43615* (2013.01); *H04N 21/643* (2013.01)

(56) References Cited

U.S. PATENT DOCUMENTS

| | | |
|---|---|---|
| 2005/0134579 A1 | 6/2005 | Hsieh et al. |
| 2006/0209745 A1 | 9/2006 | MacMullan et al. |
| 2007/0297426 A1 | 12/2007 | Haveson et al. |
| 2008/0066124 A1 | 3/2008 | Igoe et al. |
| 2009/0193469 A1 | 7/2009 | Igarashi |
| 2010/0317443 A1 | 12/2010 | Cook et al. |
| 2011/0074794 A1 | 3/2011 | Felt et al. |
| 2011/0082939 A1 | 4/2011 | Montemurro et al. |

OTHER PUBLICATIONS

Schulzrinne, H., "Real Time Streaming Protocol (RTSP)", Network Working Group, Standards Track, The Internet Society, Apr. 1998, pp. 1-82.

FIG. 11

Query/Answer about UIBC Capability
- Query :
Example:
    GET_PARAMETER rtsp://mediaserver.samsung.com/wfd RTSP/1.0
    CSeq:431
    Content-Type: text/parameters
    Session: 12345678
    Content-Length: 20
      wfd_uibc_capability
- Answer:
Example:
    RTSP/1.0 200 OK
    CSeq:431
    Content-Type: text/parameters
    Content-Length: 177 wfd_uibc_capability: yes, uibc_user_data_type= Func_Code Point , uibc_path= IB-UIBC OOB-UIBC-RTP , uibc_detailed_capa=yes, Func_Code=IB-UIBC , Point=IB-UIBC OOB-UIBC-RTP, Char=No

FIG. 12

Parameter: wfd_uibc_capability

```
wfd_uibc_capability = "wfd_uibc_capability:" SP uibc_capa CRLF
uibc_capa = "no"/ ("yes" "," SP uibc_user_data_type "," SP uibc_path "," SP
            "uibc_detailed_capa=" uibc_detailed_capa)
uibc_user_data_type = "uibc_user_data_type=" SP data_type_capa
uibc_path = "uibc_path=" SP path_capa
uibc_detailed_capa = "no"/("yes" "," SP "Func_Code=" path_capa "," SP "Point="
                     path_capa "," SP "Char=" path_capa )
data_type_capa = [Func_Code SP]           ; support Function code input
                 [Point SP]               ; support Point value input
                 [Char SP]                ; support character input
path_capa = [IB-UIBC SP]          ; support In-Band UIBC
            [OOB-UIBC-RTP SP]     ; support OOB-Band UIBC using RTP
            [OOB-UIBC-BT SP]      ; support OOB-Band UIBC using Bluetooth
            [OOB-UIBC-Zigbee SP]  ; support OOB-Band UIBC using Zigbee
            [OOB-UIBC-DLNA SP]    ; support OOB-Band UIBC using DLNA
            [No SP]               ; no path is supported
```

FIG. 13

Request/Response to enable a UIBC
- Request :
Example:
    SET_PARAMETER rtsp://mediaserver.samsung.com/wfd RTSP/1.0
    CSeq:432
    Content-Type: text/parameters
    Session: 12345678
    Content-Length: 20 wfd_uibc_setting: enable, uibc_user_data_type=Func_Code Point ,
uibc_path=IB-UIBC, detailed_setting_en=no

- Response:
 Example:
    RTSP/1.0 200 OK
    CSeq:432

Example:
    RTSP/1.0 406 Not Acceptable
    CSeq:432
    Content-Length: 17 wfd_uibc_setting

FIG. 14

- Parameter: wfd_uibc_setting
wfd_uibc_setting = "wfd_uibc_setting:" SP uibc_setting CRLF
uibc_setting = "disable"/("enable" "," SP uibc_user_data_type_en ","
                uibc_path_en SP "," SP "detailed_setting_en="
detailed_setting_en)
uibc_user_data_en = "uibc_user_data_type=" data_type_en
uibc_path_en = "uibc_path=" SP path_en
detailed_setting_en = "no"/("yes" "Func_Code=" SP detailed_path_en ","
                   "Point=" SP detailed_path_en ","
                   "Char=" SP detailed_path_en )
data_type_en = [Func_Code SP] [Point SP] [Char SP]
path_en = "IB-UIBC"/ "OOB-UIBC-RTP" / "OOB-UIBC-BT"/ "OOB-UIBC-Zigbee"
        / "Detailed_set"    ; detailed information should be concatenated
detailed_path_en = "IB-UIBC"/ "OOB-UIBC-RTP" / "OOB-UIBC-BT"
                / "OOB-UIBC-Zigbee" /"No"

FIG. 15

Send/Response User Input using IB-UIBC
 - Request :
  Example:
   < Case1: Function Code>
    SET_PARAMETER rtsp://mediaserver.samsung.com/wfd RTSP/1.0
    CSeq:433
    Content-Type: text/parameters
    Session: 12345678
    Content-Length: 35
      wfd_uibc_user_data: Func_Code=0xA4

< Case2: Pointing Value>
    SET_PARAMETER rtsp://mediaserver.samsung.com/wfd RTSP/1.0
    CSeq:434
    Content-Type: text/parameters
    Session: 12345678
    Content-Length: 68
      wfd_uibc_user_data: Point=(354,600) over (1920,1080) Left-One-Click < Case3: text data>
    SET_PARAMETER rtsp://mediaserver.samsung.com/wfd RTSP/1.0
    CSeq:435
    Content-Type: text/parameters
    Session: 12345678
    Content-Length: 29 wfd_uibc_user_data: Char='A'

- Response:
  Example:
    RTSP/1.0 200 OK
    CSeq:434

Example:
    RTSP/1.0 406 Not Acceptable
    CSeq:434

FIG. 16

- Parameter: wfd_uibc_user_data
wfd_uibc_user_data = "wfd_uioc_user_data:" SP uibc_data CRLF
uibc_data = ("Func_Code=" data_func_code) / ("Point=" data_point )
            / ("Char=" data_char)
data_func_code = OCTET        ; 8 bits of function code
data_point = "(" point_x "," point_y ")" SP "over (" max_x "," max_y ")" SP action
data_char = CHAR        ; Any ASCII character excluding NUL
point_x = 1*4(DIGIT)    ; current pointing value(0~9999) in x horizontal axis
point_y = 1*4(DIGIT)    ; current pointing value(0~9999) in y vertical axis
max_x = 1*4(DIGIT) ; maximum pointing value(0~9999) in x horizonta axis, horizontal resolution
max_y = 1*4(DIGIT) ; maximum pointing value(0~9999) in y vertical axis, vertical resolution
action = "Moving"/"One-Click"/ "Double-Click"/ "Left-One-Click"
            /"Left-Double-Click"/ "Right-One-Click"/ "Right-Double-Click"
            / "Wheel-Up" /"Wheel-Down"

FIG. 17

Request/Response to disable the UIBC
 - Request :
   Example:
      SET_PARAMETER rtsp://mediaserver.samsung.com/wfd RTSP/1.0
      CSeq: 500
      Content-Type: text/parameters
      Session: 12345678
      Content-Length: 26 wfd_uibc_setting: disable

- Response:
   Example:
      RTSP/1.0 200 OK
      CSeq:500

Example:
      RTSP/1.0 406 Not Acceptable
      CSeq:500
       Content-Length: 17 wfd_uibc_setting

Notify that the UIBC is disabled
   Example:
      SET_PARAMETER rtsp://mediaserver.samsung.com/wfd RTSP/1.0
      CSeq: 534
      Content-Type: text/parameters
      Session: 12345678
      Content-Length: 26 wfd_uibc_setting: disable

METHOD AND APPARATUS FOR PROVIDING USER INPUT BACK CHANNEL IN AUDIO/VIDEO SYSTEM

CROSS-REFERENCE TO RELATED PATENT APPLICATION

This application is a continuation of U.S. patent application Ser. No. 12/917,684 filed on Nov. 2, 2010, in the U.S. Patent and Trademark Office, which claims priority from U.S. Provisional Application No. 61/257,186, filed on Nov. 2, 2009, in the U.S. Patent and Trademark Office, and Korean Patent Application No. 10-2010-0101872, filed on Oct. 19, 2010, in the Korean Intellectual Property Office, the disclosures of which are incorporated herein in their entirety by reference.

BACKGROUND

1. Field

Apparatuses and methods consistent with the exemplary embodiments relate to providing a user input back channel (UIBC) in an audio/video (AV) system, and more particularly, to a method and apparatus for providing a UIBC in an AV source device and an AV sink device communicating according to a wireless fidelity (Wi-Fi) display (WFD) standard.

2. Description of the Related Art

Recently, a wireless fidelity (Wi-Fi) display (WFD) standard has been newly defined based on a requirement to transmit audio/video (AV) data while satisfying high quality and low latency. The WFD standard considers AV data transmission and control via a user input in a source device. However, it is highly likely that a user may be nearer to a sink device than the source device, and thus when the user controls a device or inputs data via the sink device, a method of transmitting a control command or the user data from the sink device to the source device is required.

SUMMARY

The exemplary embodiments provide a user input back channel (UIBC) between an audio/video (AV) source device and an AV sink device communicating according to a wireless fidelity (Wi-Fi) display (WFD) standard.

According to an aspect of the exemplary embodiments, there is provided a method of communicating with an audio/video (AV) source device, wherein the method is performed by an AV sink device, the method including: setting up an AV control session and an AV data session with the AV source device according to a wireless fidelity (Wi-Fi) display (WFD) standard; enabling a user input back channel (UIBC) to the AV source device, by using the AV control session; and transmitting a user input to the AV source device through the UIBC.

The user input may include at least one of a function code for controlling the AV source device, pointing information, and character data.

The AV control session may be a real-time streaming protocol (RTSP) session.

The enabling of the UIBC may include: receiving a query about the UIBC capability of the AV sink device from the AV source device; transmitting a response related to the UIBC capability of the AV sink device to the AV source device; receiving, from the AV source device, a UIBC enable request based on the UIBC capability of the AV sink device; and transmitting a response related to the UIBC enable request to the AV source device.

The UIBC capability of the AV sink device may include at least one of RTSP, real-time transport protocol (RTP), Bluetooth, Zigbee, and digital living network association (DLNA).

The enabling of the UIBC may include: transmitting a query about the UIBC capability of the AV source device to the AV source device; receiving a response related to the UIBC capability of the AV source device from the AV source device; transmitting a UIBC enable request to the AV source device based on the UIBC capability of the AV source device; and receiving a response related to the UIBC enable request from the AV source device.

The UIBC capability of the AV source device may include at least one of real-time streaming protocol (RTSP), real-time transport protocol (RTP), Bluetooth, Zigbee, and digital living network association (DLNA).

The transmitting of the user input may include transmitting data and control information about the user input through the AV control session.

The enabling of the UIBC may include setting up a data session of the UIBC by using the AV control session, and the transmitting the user input may include transmitting data about the user input through the data session of the UIBC.

The transmitting the user input may further include transmitting control information about the user input through the AV control session.

The data session of the UIBC may include at least one of an RTP session, a Bluetooth session, a Zigbee session, and a DLNA session.

The transmitting the user input may further include transmitting control information about the user input through the DLNA session.

The method may further include notifying disablement of the UIBC to the AV source device.

According to another aspect of the exemplary embodiments, there is provided a method of communicating with an audio/video (AV) sink device, wherein the method is performed by an AV source device, the method including: setting up an AV control session and an AV data session with the AV sink device according to a wireless fidelity (Wi-Fi) display (WFD) standard; enabling a user input back channel (UIBC) from the AV sink device, by using the AV control session; and receiving a user input from the AV sink device through the UIBC.

The user input may include at least one of a function code for controlling the AV source device, pointing information, and character data.

The AV control session may be a real-time streaming protocol (RTSP) session.

The enabling of the UIBC may include: transmitting a query about the UIBC capability of the AV sink device to the AV sink device; receiving about a response related to the UIBC capability of the AV sink device from the AV sink device; transmitting a UIBC enable request to the AV sink device based on the UIBC capability of the AV sink device; and receiving a response related to the UIBC enable request from the AV sink device.

The UIBC capability of the AV sink device may include at least one of RTSP, real-time transport protocol (RTP), Bluetooth, Zigbee, and digital living network association (DLNA).

The enabling of the UIBC may include: receiving a query about UIBC capability of the AV source device from the AV sink device; transmitting about a response related to the UIBC capability of the AV source device to the AV sink device; receiving a UIBC enable request from the AV sink device based on the UIBC capability of the AV source device; and transmitting a response related to the UIBC enable request to the AV sink device.

The UIBC capability of the AV source device may include at least one of RTSP, RTP, Bluetooth, Zigbee, and DLNA.

The receiving the user input may include receiving data and control information about the user input through the AV control session.

The enabling of the UIBC may include setting up a data session of the UIBC by using the AV control session, and the receiving the user input may include receiving data bout the user input through the data session of the UIBC.

The receiving the user input may further include receiving control information about the user input through the AV control session.

The data session of the UIBC may include at least one of a RTP session, a Bluetooth session, a Zigbee session, and a DLNA session.

The receiving the user input may further include receiving control information about the user input through the DLNA session.

The method may further include: transmitting a UIBC disable request to the AV sink device; and receiving a response about the UIBC disable request from the AV sink device.

According to another aspect of the exemplary embodiments, there is provided an audio/video (AV) sink device communicating with an AV source device, the AV sink device including: a controller for setting up an AV control session and an AV data session with the AV source device according to a wireless fidelity (Wi-Fi) display (WFD) standard, and enabling a user input back channel (UIBC) to the AV source device by using the AV control session; and a communicator for transmitting a user input to the AV source device through the UIBC.

The communicator may transmit data and control information about the user input through the AV control session.

The controller may set up a data session of the UIBC by using the AV control session, and the communicator may transmit data about the user input through the data session of the UIBC.

The communicator may transmit control information about the user input through the AV control session.

According to another aspect of the exemplary embodiments, there is provided an audio/video (AV) source device communicating with an AV sink device, the AV source device including: a controller for setting up an AV control session and an AV data session with the AV sink device according to a wireless fidelity (Wi-Fi) display (WFD) standard, and enabling a user input back channel (UIBC) from the AV sink device by using the AV control session; and a communicator for receiving a user input from the AV sink device through the UIBC.

The communicator may receive data and control information about the user input through the AV control session.

The controller may set up a data session of the UIBC by using the AV control session, and the communicator may receive data about the user input through the data session of the UIBC.

The communicator may receive control information about the user input through the AV control session.

According to another aspect of the exemplary embodiments, there is provided a communication system including: an audio/video (AV) source device transmitting AV data; and an AV sink device receiving AV data, wherein the AV source device sets up an AV control session and an AV data session with the AV sink device, according to a wireless fidelity (Wi-Fi) display (WFD) standard, and enables a user input back channel (UIBC) from the AV sink device by using the AV control session, and the AV sink device transmits a user input to the AV source device through the UIBC.

According to another aspect of the exemplary embodiments, there is provided a computer readable recording medium having embodied thereon, instructions that, when executed by a computer, causes the computer to perform any one of the above methods.

BRIEF DESCRIPTION OF THE DRAWINGS

The above and other aspects will become more apparent by describing in detail exemplary embodiments thereof with reference to the attached drawings in which:

FIG. 11 is a diagram of query and response message formats about UIBC capability, according to an exemplary embodiment;

FIG. 12 is a diagram of a definition of a wfd_uibc_capability parameter according to an exemplary embodiment;

FIG. 13 is a diagram of UIBC enable request and response message formats according to an exemplary embodiment;

FIG. 14 is a diagram of a definition of a wfd_uibc_setting parameter according to an exemplary embodiment;

FIG. 15 is a diagram of a user input data message format using in-band UIBC, according to an exemplary embodiment;

FIG. 16 is a diagram of a definition of a wfd_uibc_user_data parameter according to an exemplary embodiment;

FIG. 17 is a diagram of a UIBC disable request message format according to an exemplary embodiment;

DETAILED DESCRIPTION OF THE EXEMPLARY EMBODIMENTS

Figure 1:
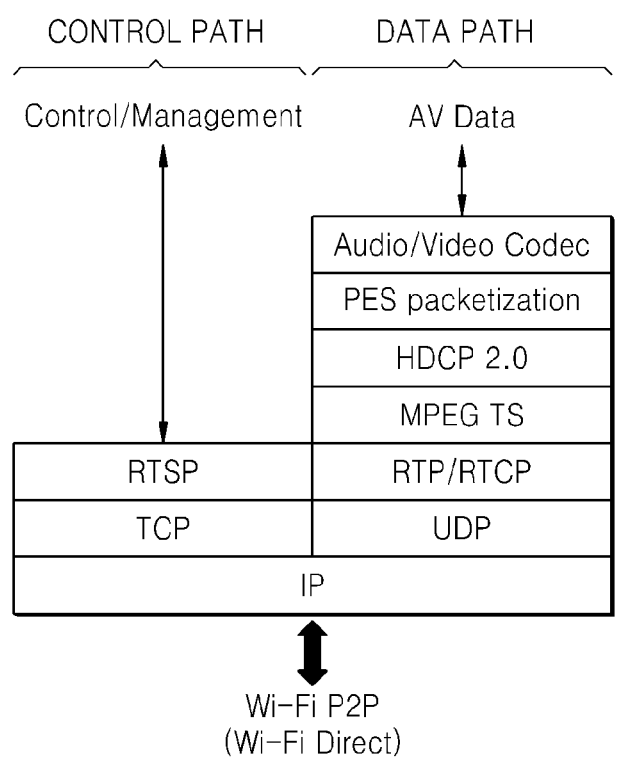
FIG. 1 is a diagram of a protocol stack of a wireless fidelity (Wi-Fi) display (WFD) standard, according to an exemplary embodiment.

Hereinafter, the exemplary embodiments will be described more fully with reference to the accompanying drawings, in which exemplary embodiments are shown. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the exemplary embodiments to those skilled in the art.

While describing the exemplary embodiments, detailed descriptions about related well-known functions or configurations that may diminish the clarity of the points of the exemplary embodiments are omitted. Also, the terminologies used are defined considering functions herein, and may be called differently based on intentions or customs of a user or an operator. Accordingly, the terminologies may be defined based on the contents of the specification. Also, when a part "includes" an element, the part may further include another element, unless otherwise described. For convenience of description, an apparatus and a method will be described together if required.

In the drawings, like reference numerals denote like elements, and the sizes and thicknesses of elements may be exaggerated for clarity.

FIG. 1 is a diagram of a protocol stack of a wireless fidelity (Wi-Fi) display (WFD) standard, according to an exemplary embodiment. FIG. 1 shows a protocol stack of layer 3 (L3) internet protocol (IP) layer and upper, wherein a protocol of layer 2 (L2) or lower may use Wi-Fi peer to peer (P2P) standard or other standards defined in Wi-Fi. A protocol stack of WFD is largely classified into a control path and a data path. According to an exemplary embodiment, a real-time streaming protocol (RTSP) may be used as the control path, and a real-time transport protocol (RTP) or an RTP control protocol (RTCP) may be used as the data path. The RTSP, the RTP, and the RTCP are well known to one of ordinary skill in the art, and thus will not be described in detail as descriptions thereof may diminish the clarity of the points of the exemplary embodiments.

Figure 2:
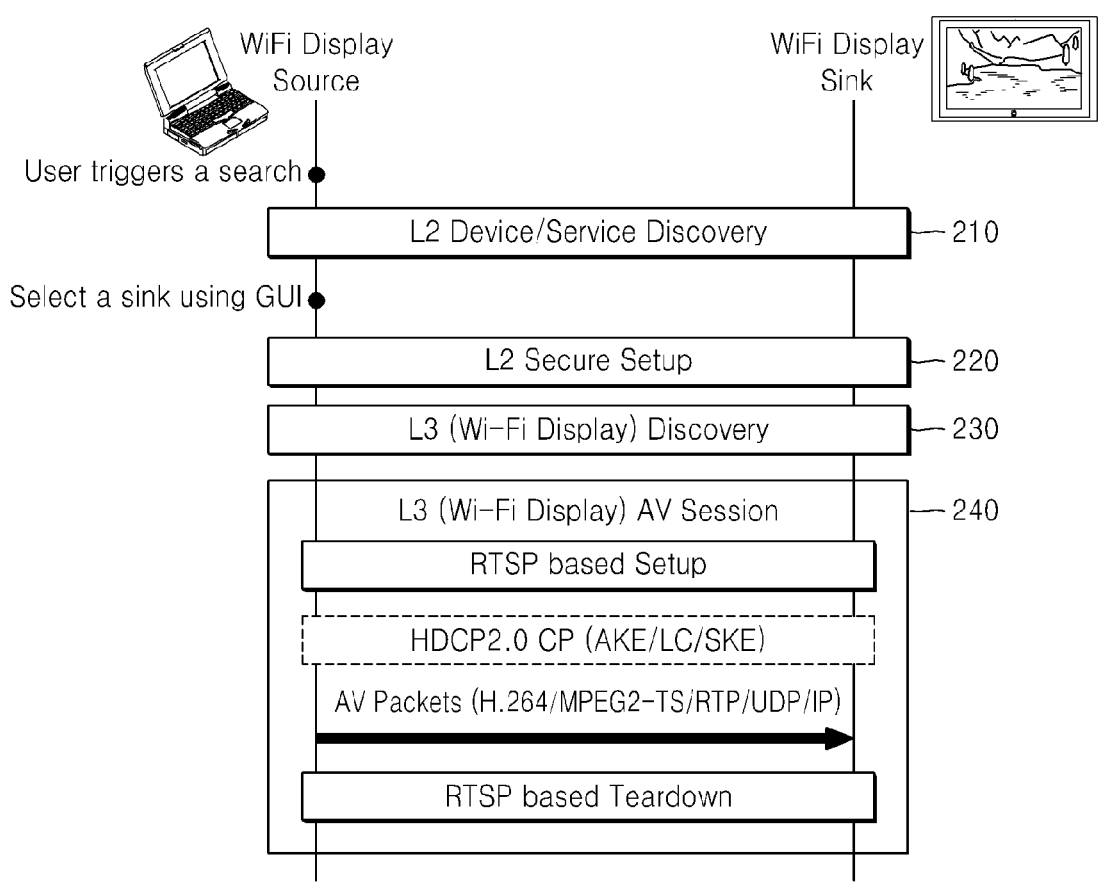
FIG. 2 is a diagram schematically illustrating a flow for generating a WFD audio/video (AV) session according to an exemplary embodiment.

FIG. 2 is a diagram schematically illustrating a flow for generating a WFD audio/video (AV) session according to an exemplary embodiment. First, L2 device and service discovery is performed in operation 210, between a source device and a sink device supporting a WFD. At this time, it is determined that the source device and the sink device support the WFD. Here, an L2 secure setup is performed in operation 220, and then L3 WFD discovery, in which detailed device information and service information is exchanged, is performed in operation 230. Then, an L3 AV session is established in operation 240. Here, an RTSP is used for an AV control session, an RTP is used for an AV data session, and a high-bandwidth digital content protection (HDCP) 2.0 is used for content protection. AV data is converted into a data unit transportable according to MPEG2 TS or H.264, and is transmitted from the source device to the sink device via the RTP. An error feedback is performed by using the RTCP. After the AV data is transmitted, an AV session is ended.

Here, when a user input, such as a control command or data, is input to the source device, the user input is directly reflected on the source device. In other words, when the user input is input to the source device, the source device processes the user input without having to transmit the user input to the sink device.

Figure 3:
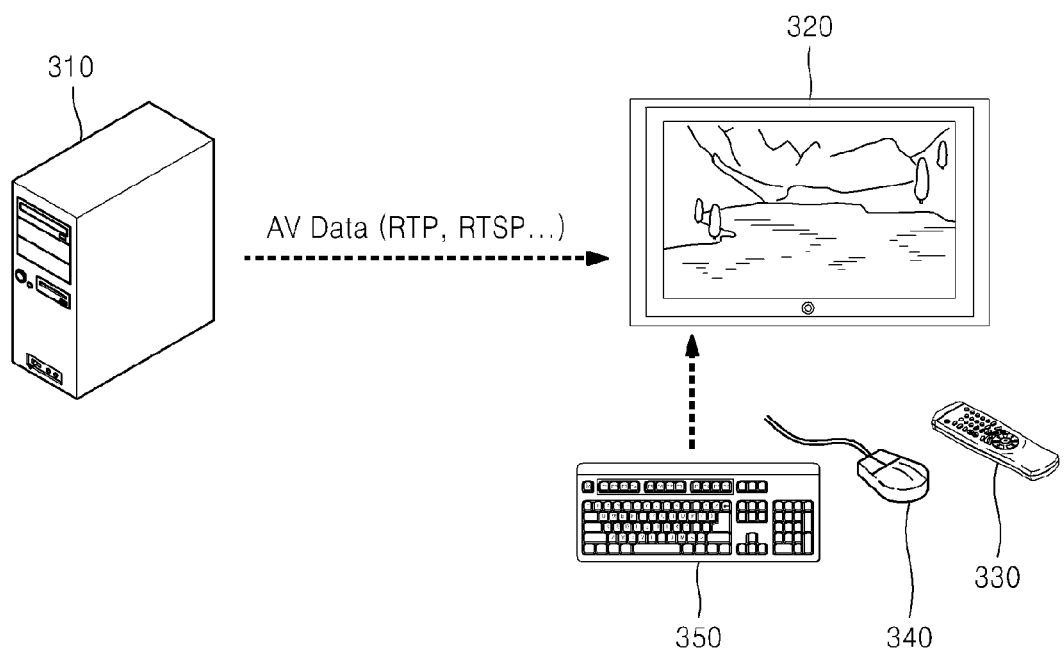
FIG. 3 is a diagram of a use case of a WFD, according to an exemplary embodiment.

FIG. 3 is a diagram of an example of a WFD, according to an exemplary embodiment. Referring to FIG. 3, a personal computer (PC) 310 in a bedroom transmits AV data to a television (TV) 320 in a living room, and the TV 320 outputs the AV data upon receiving the AV data. Thus, a user may view AV contents provided by the PC 310 in the bedroom through the TV 320 in the living room. Here, the PC 310 transmitting the AV data is an AV source device, and the TV 320 receiving the AV data is an AV sink device.

Since the user is nearer to the TV 320 than the PC 310, the user may want to control the system by using an input device of the TV 320, such as a remote controller 330, a mouse 340, or a keyboard 350.

Figure 4:
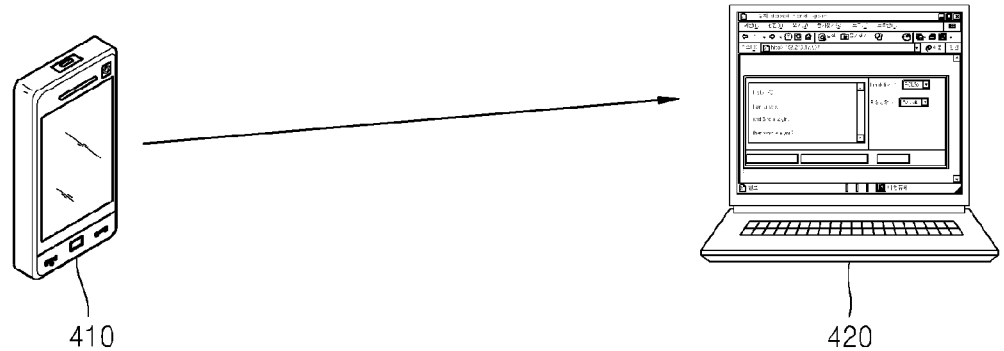
FIG. 4 is a diagram of a use case of a WFD, according to another exemplary embodiment.

FIG. 4 is a diagram of a use case of a WFD, according to another exemplary embodiment. Referring to FIG. 4, a mobile device 410, such as a smart phone or a mobile internet device (MID), provides AV data, and since a screen of the mobile device 410 is small, a user may want to view the AV data through a lap top 420 having a larger screen than the mobile device 410. Here, since an input device of the lap top 420 is also larger and more convenient than that of the mobile device 410, the user may want to control the system by using the input device of the lap top 420. Here, the mobile device 410 transmitting the AV data is an AV source device, and the lap top 420 receiving the AV data is an AV sink device.

In the illustrations shown in FIGS. 3 and 4, since AV data is provided by a source device and a user input is input in a sink device, it is required to transmit the user input from the sink device to the source device. Here, the user input includes function code or command message information generated through a function key of a remote control, pointing coordinate information generated by a pointing device, such as a mouse or a touch panel, or a character or text generated by a keyboard. The function code or command message information, the pointing coordinate information, and the character or text information are processed according to corresponding characteristics.

Figure 5:
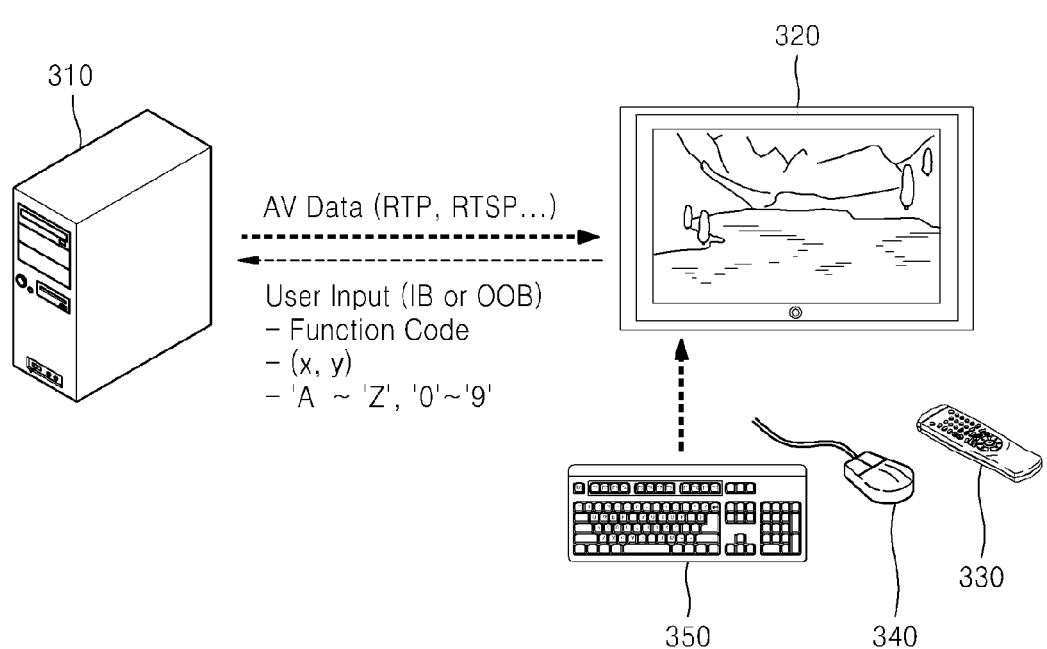
FIG. 5 is a diagram for describing a user input back channel (UIBC) according to an exemplary embodiment.

FIG. 5 is a diagram for describing a user input back channel (UIBC) according to an exemplary embodiment. Methods of transmitting a user input from a sink device to a source device may be largely classified into an in-band UIBC (IB-UIBC) method and an out-of-band UIBC (OOB-UIBC) method. The IB-UIBC method transmits the user input by using a related art SET_PARAMETER method by adding new parameters for the user input to a related art RTSP. In the OOB-UIBC method, setup or control of the UIBC is implemented by adding new parameters to an RTSP, but the user input uses a separate RTP session or is transmitted through a separate protocol, such as Bluetooth, Zigbee, or digital living network association (DLNA). Also, as described above, the user input may be a function code, pointing information, or character data, wherein various types of user inputs may be transmitted through one UIBC or different UIBCs.

Figure 6:
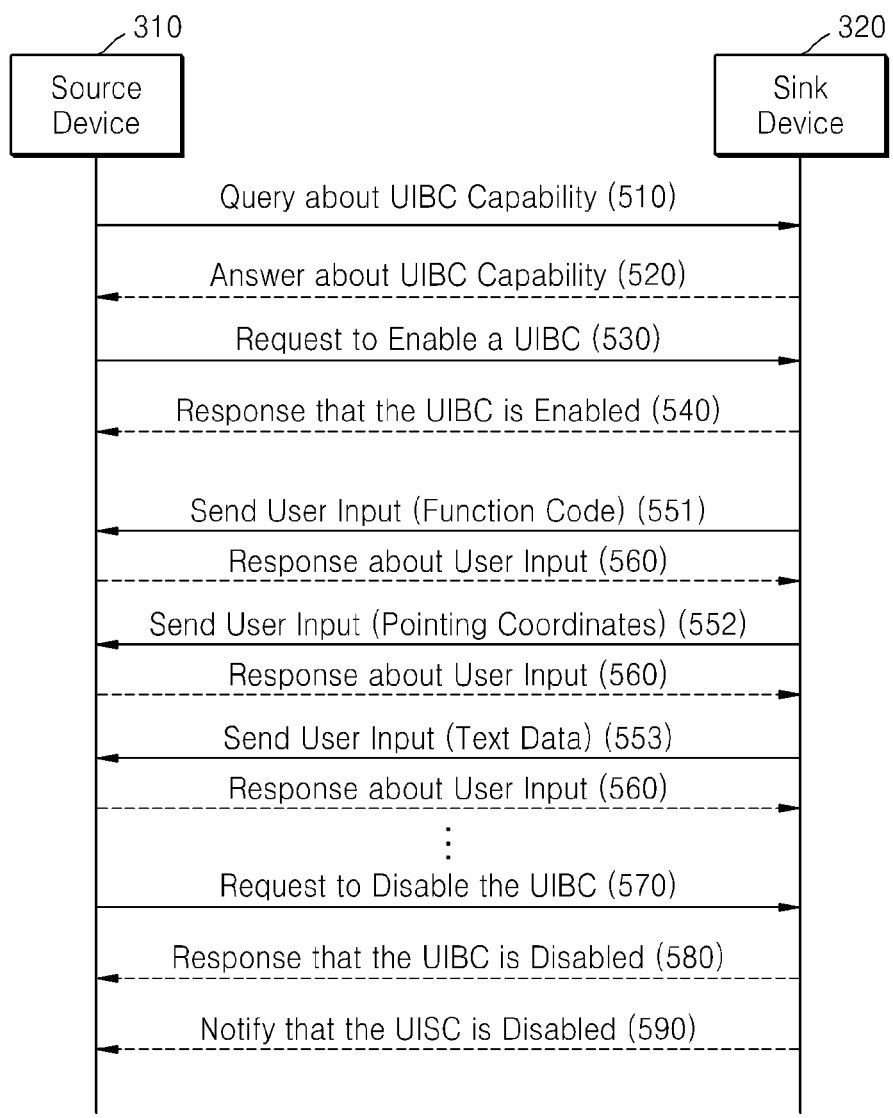
FIG. 6 is a flowchart schematically illustrating a method of providing a UIBC, according to an exemplary embodiment.

FIG. 6 is a flowchart schematically illustrating a method of providing a UIBC, according to an exemplary embodiment. A source device and a sink device set up an AV control session and an AV data session according to a WFD standard, and then a UIBC from the sink device to the source device is enabled by using the AV control session, in operations 510 through 540.

First, the source device queries the UIBC capability of the sink device, in operation 510. Here, a wfd_uibc_capability parameter indicating the UIBC capability is defined, and is queried according to GET_PARAMETER. The sink device responds about its UIBC capability in operation 520. The UIBC capability may be included as an information element or field in the device capability or sink capability defined in the WFD standard.

The source device requests the sink device to enable a desired UIBC from among UIBCs provided by the sink device, according to a user selection or an automatic selection, in operation 530. Such a UIBC enable request message uses a SET_PARAMETER message in an RTSP, and newly defines a related parameter. The parameter related to the UIBC enable request message is a wfd_uibc_setting parameter, and the source device may enable or disable the desired parameter by using the wfd_uibc_setting parameter. Definition of the wfd_uibc_setting parameter will be described later. Upon receiving the UIBC enable request message, the sink device enables the desired UIBC, and responds to the source device about a result of enablement, in operation 540.

Such a process of enabling a UIBC described above may be performed according to a request of the sink device. In other words, operations 510 and 530 may be performed by the sink device and operations 520 and 540 may be performed by the source device, thereby enabling a UIBC from the sink device to the source device.

When the desired UIBC is enabled, a user input generated in the sink device is transmitted to the source device in operations 551, 552, 553, and 560, and thus AV data or a WFD function may be controlled. In the IB-UIBC method, a wfd_uibc_user_data parameter is transmitted to the source device by using the SET_PARAMETER, and in the OOB-UIBC, the user input may be transmitted through data payload.

When the UIBC function is disabled by the source device, the source device transmits a disable UIBC request message to the sink device in operation 570, and the sink device responds to the source device after disabling the UIBC function in operation 580. When the sink device disables the UIBC, the sink device may notify the source device that the UIBC is disabled by using a method of transmitting the wfd_uibc_setting parameter to the source device by using the SET_PARAMETER, in operation 590.

Figure 7:
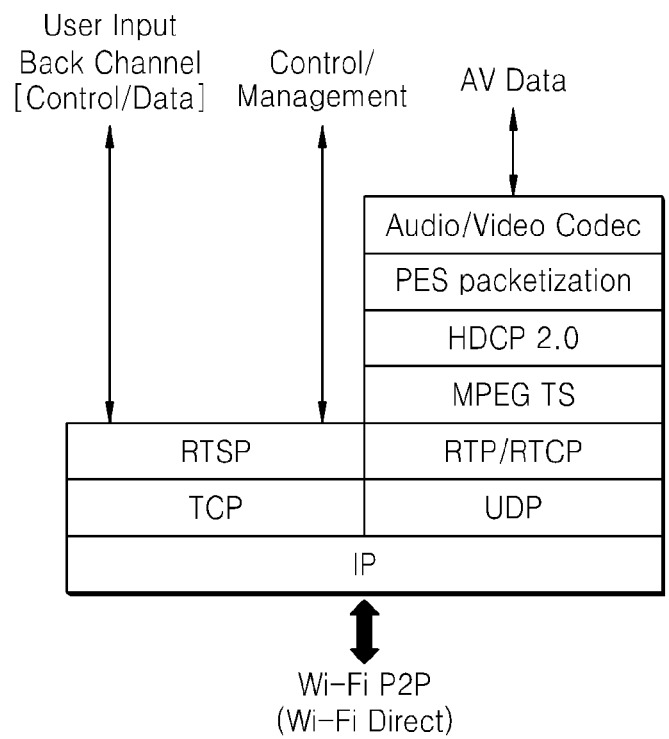
FIG. 7 is a diagram of a protocol stack of an in-band UIBC according to an exemplary embodiment.

FIG. 7 is a diagram of a protocol stack of an IB-UIBC according to an exemplary embodiment. Referring to FIG. 7, the IB-UIBC uses an RTSP as a data path and a control path. In other words, data and control information about a user input are all transmitted through the RTSP. The IB-UIBC is realized by additionally defining new parameters for transmitting the user input, in an RTSP message. The added parameter is transmitted to a source device through a SET_PARAMETER. The added parameter, i.e., a wfd_uibc_user_data parameter, includes information about a user input type, and a user input data message is defined according to a corresponding type. Definition of the wfd_uibc_user_data parameter will be described later. Upon receiving the user input from a sink device, the source device responds about the reception.

In an OOB-UIBC method, the user input is transmitted by using a separate RTP session or through a separate path, such as Bluetooth, Zigbee, or DLNA, instead of transmitting the user input through an existing RTSP. In the OOB-UIBC method, a control path for requesting UIBC capability or enablement of a UIBC may use an RTSP, like in an IB-UIBC method. According to another exemplary embodiment, a UIBC may be controlled through a separate path, like the user input.

Figure 8:
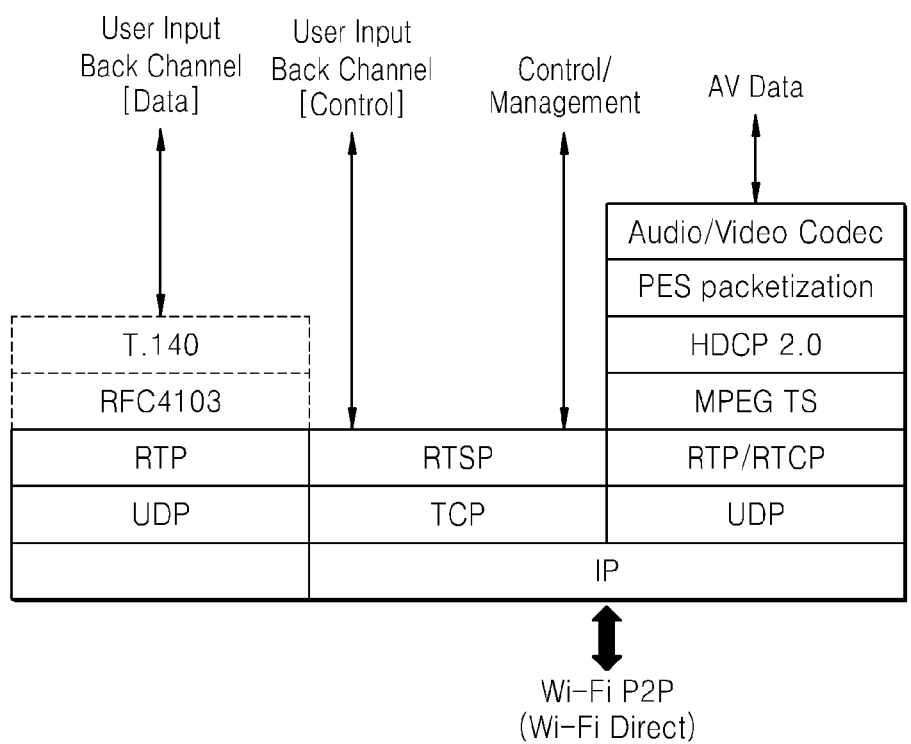
FIG. 8 is a diagram of a protocol stack of an out-of-band UIBC using a real-time transport protocol (RTP), according to an exemplary embodiment.

FIG. 8 is a diagram of a protocol stack of an OOB-UIBC using a RTP, according to an exemplary embodiment. Referring to FIG. 8, a data path of a UIBC uses a separate RTP session, and a control path of the UIBC uses an RTSP. In other words, the separate RTP session is set up between a source device and a sink device so as to be used as a path for transmitting a user input. A user input data message may be directly inserted into and transmitted with RTP payload, or coded as and transmitted with a text/t140 block by using RTP payload for text conversation (RFC4103). Here, text/t140 is a multipurpose internal mail extensions (MIME) registered type, is a format defined in RFC4103, is UTF-8 coded, and used in H.323, SIP, 3GPP, or the like.

Figure 9:
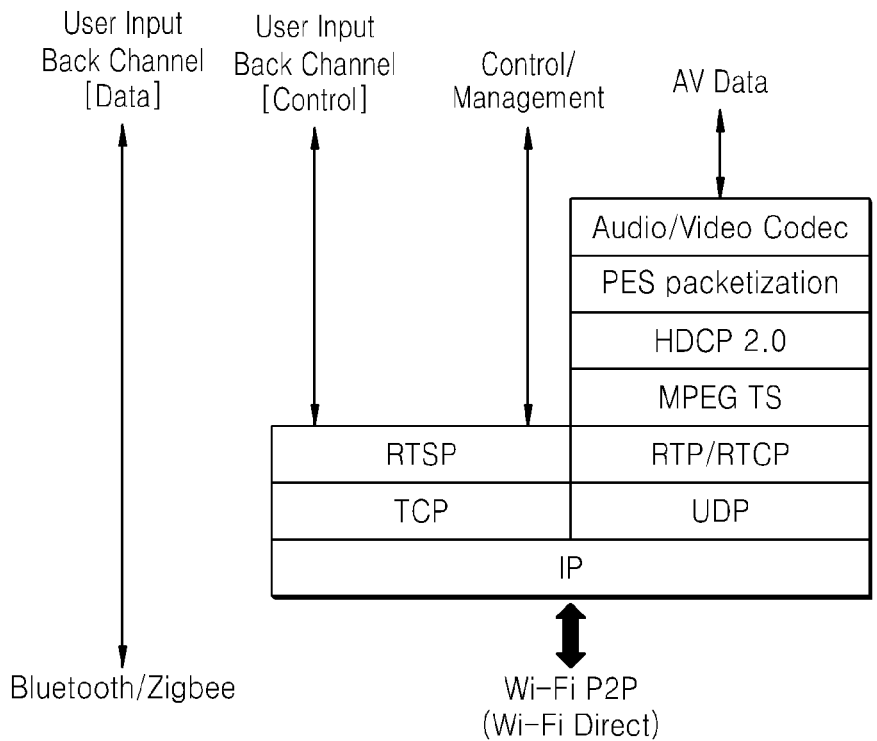
FIGS. 9 and 10 are diagrams of a protocol stack of an out-of-band UIBC using a separate protocol, according to exemplary embodiments.
Figure 10:
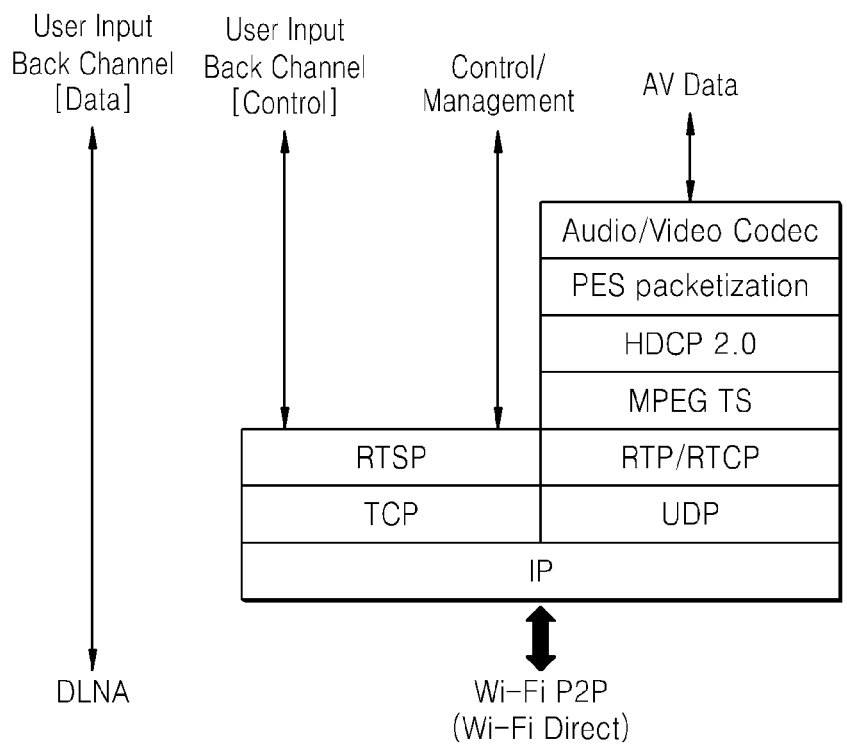

FIGS. 9 and 10 are diagrams of a protocol stack of an OOB-UIBC using a separate protocol, according to exemplary embodiments.

FIG. 9 is a diagram of a protocol stack of an OOB-UIBC using Bluetooth or Zigbee, according to an exemplary embodiment. Referring to FIG. 9, a data path of a UIBC uses Bluetooth or Zigbee, and a control path of the UIBC uses an RTSP. Alternatively, the control path of the UIBC may use Bluetooth or Zigbee.

The OOB-UIBC using a separate protocol may be used to transmit a user input in real-time while minimizing an affect between AV data transmission and user input transmission, and may be used when the user input requires low latency, like pointing information, or when the user input is to be transmitted while not effecting AV data streaming. Here, a source device and a sink device support the same protocol. The user input is transmitted to application data of the separate protocol. A user input data message may be directly inserted into and transmitted with a payload, or only the user input may be inserted into and transmitted with a payload.

FIG. 10 is a diagram of a protocol stack of an OOB-UIBC using a DLNA. Referring to FIG. 9, a data path of a UIBC uses the DLNA, and a control path of the UIBC uses an RTSP. Alternatively, the control path of the UIBC may use the DLNA. A user input may be transmitted to a remote user interface (RUI) of the DLAN, and a payload may use a format defined in the DLNA.

UIBC capability is exchanged or UIBC is enabled while the RTSP is set up for control or management, in a WFD specification. Formats of messages and definitions of parameters described above will now be described.

FIG. 11 is a diagram of query and response message formats about UIBC capability, according to an exemplary embodiment. Referring to FIG. 11, in order for a source device to transmit a UIBC capability query to a sink device, the source device requests a wfd_uibc_capability parameter by using a GET_PARAMETER method. A response of the sink device about the UIBC capability query follows a response format of the GET_PARAMETER defined in an RTSP. Referring to FIG. 11, the sink device sends a response to the source device indicating that the sink device supports an IB-UIBC and an OOB-UIBC using an RTP, and has the capability of transmitting a function code through the IB-UIBC and pointing information through the IB-UIBC or OOB-UIBC.

FIG. 12 is a diagram of a definition of a wfd_uibc_capability parameter according to an exemplary embodiment. Referring to FIG. 12, the wfd_uibc_capability parameter may be defined in an augmented Backus-Naur Form (ABNF) format, and includes information about whether a UIBC is supported, a supported UIBC path, and a supported user input data type. A UIBC_detailed_capa parameter may be defined considering that a supported UIBC path may be different according to a user input type.

FIG. 13 is a diagram of UIBC enable request and response message formats according to an exemplary embodiment. Referring to FIG. 13, when a source device transmits a request to a sink device to enable a UIBC, a wfd_uibc_setting parameter is set and transmitted to the sink device by using a SET_PARAMETER method. In FIG. 13, the source device enables a user input related to a function code and pointing information of the sink device, and uses only an IB_UIBC as a path.

A response by the sink device to the request made by the AV source device to enable the UIBC follows a response format of a SET_PARAMETER defined in an RTSP. The sink device responds with an error code if the request by the source device is not processed.

FIG. 14 is a diagram of a definition of a wfd_uibc_setting parameter according to an exemplary embodiment. Referring to FIG. 14, the wfd_uibc_setting parameter defines a UIBC path to be enabled by a sink device, and a user input data type. A detailed_setting_en parameter may be defined considering that a supported UIBC path may be different according to a type of user input.

FIG. 15 is a diagram of a user input data message format using IB-UIBC, according to an exemplary embodiment. Referring to FIG. 15, a SET_PARAMETER method is used when a user input is transmitted from a sink device to a source device by using an IB-UIBC path. Here, a wfd_uibc_user_data parameter is used.

A response of the sink device to the user input follows a response format of the SET_PARAMETER defined in an RTSP. The source device responds with an error code if the request by the sink device is not processed.

FIG. 16 is a diagram of a definition of a wfd_uibc_user_data parameter according to an exemplary embodiment. Referring to FIG. 16, the wfd_uibc_user_data parameter defines a user input type and user input data input to a sink device. The same parameter is used when a user input is transmitted through an OOB-UIBC. When the user input data is a function code, the user input data is defined on an octet. When the user input data is pointing information, the wfd_uibc_user_data parameter is defined in a coordinate of a current point, resolution of the sink device, and an action of a user. The action of the user may show whether a user clicked a button, and which button is clicked. When the user input data is a character, CHAR is input.

FIG. 17 is a diagram of a UIBC disable request message format according to an exemplary embodiment. Referring to FIG. 17, when a source device requests to disable a UIBC, a wfd_uibc_setting parameter is disabled and transmitted to a sink device by using a SET_PARAMETER method. The wfd_uibc_setting is also used when multiple UIBC paths or types are enabled and a change is required.

A response by the sink device to the request by the AV source device to disable the UIBC follows a response format of a SET_PARAMETER defined in an RTSP. The sink device responds with an error code if the request by the source device is not processed.

Figures 18, 19:
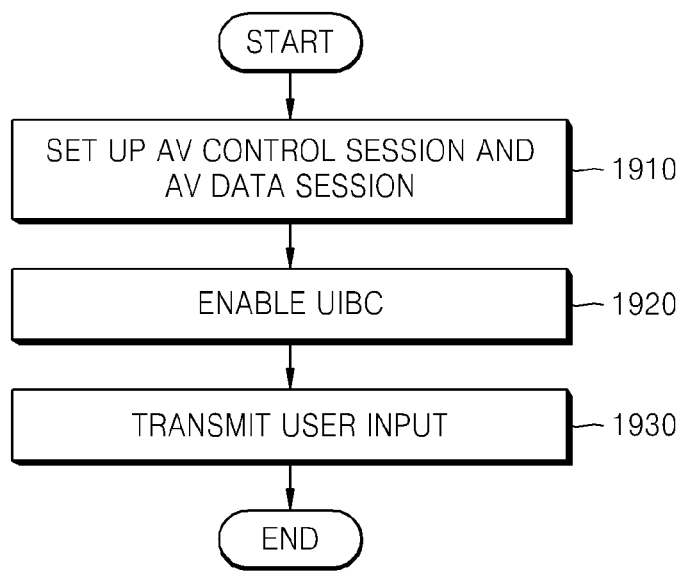
FIG. 18 is a diagram of a UIBC disable notification message format according to an exemplary embodiment.
FIG. 19 is a flowchart schematically illustrating a method of communicating with an AV source device, wherein the method is performed by an AV sink device, according to an exemplary embodiment.

FIG. 18 is a diagram of a UIBC disable notification message format according to an exemplary embodiment. Referring to FIG. 18, a wfd_uibc_setting parameter is disabled and transmitted to a source device by using a SET_PARAMETER method when a UIBC is disabled due to selection of a user through a sink device or other reasons. Here, the source device may not respond.

FIG. 19 is a flowchart schematically illustrating a method of communicating with an AV source device, wherein the method is performed by an AV sink device, according to an exemplary embodiment. Referring to FIG. 19, the method includes setting up an AV control session and an AV data session with an AV source device, according to a WFD standard in operation 1910, enabling a UIBC to the AV source device by using the AV control session in operation 1920, and transmitting a user input to the AV source device through the UIBC in operation 1930.

Figure 20:
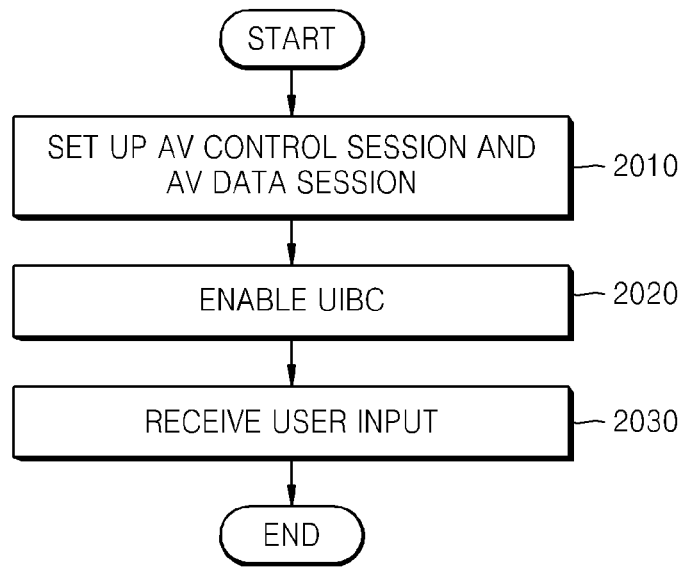
FIG. 20 is a flowchart schematically illustrating a method of communicating with an AV sink device, wherein the method is performed by an AV source device, according to an exemplary embodiment.

FIG. 20 is a flowchart schematically illustrating a method of communicating with an AV sink device, wherein the method is performed by an AV source device, according to an exemplary embodiment. Referring to FIG. 20, the method includes setting up an AV control session and an AV data session with an AV sink device, according to a WFD standard in operation 2010, enabling a UIBC from the AV sink device by using the AV control session in operation 2020, and receiving a user input from the AV sink device through the UIBC in operation 2030.

Figure 21:
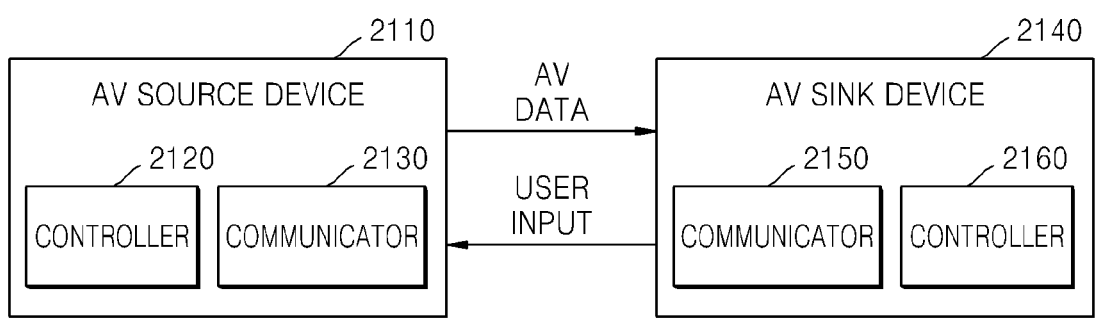
FIG. 21 is a block diagram schematically illustrating an AV communication system according to an exemplary embodiment.

FIG. 21 is a block diagram schematically illustrating an AV communication system according to an exemplary embodiment. Referring to FIG. 21, the AV communication system includes an AV source device 2110 and an AV sink device 2140. The AV source device 2110 includes a controller 2120 for setting up an AV control session and an AV data session with the AV sink device 2140 according to a WFD standard, and enabling a UIBC from the AV sink device 2140 by using the AV control session, and a communicator 2130 for receiving a user input from the AV sink device 2140 through the UIBC. The AV sink device 2140 includes a controller 2160 for setting up an AV control session and an AV data session with the AV source device 2110 according to the WFD standard, and enabling a UIBC to the AV source device 2110 by using the AV control session, and a communicator 2150 for transmitting a user input to the AV source device 2110 through the UIBC.

As described above, a method of transmitting a user input from a sink device to a source device in a WFD standard is provided. Also, user convenience and expansibility are increased as a UIBC can be set up according to data paths or user data types. Also, the UIBC is controlled by adding new parameters to a related art RTSP, and thus the method is easily realized.

As is well known to one of ordinary skill in the art, the exemplary embodiments may be variously realized, such as in a program command executed by a processor, a software module, a microcode, a computer program product recorded on a computer (including all devices having an information processing function) readable recording medium, a logic circuit, a semiconductor on demand, or firmware. Also, the exemplary embodiments may be realized in hardware, software, or in a combination of hardware and software.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the exemplary embodiments can be easily construed by programmers skilled in the art to which the exemplary embodiments pertain. Also, a data format of a message used herein may be recorded on a recording medium.

While the aspects have been particularly shown and described with reference to exemplary embodiments thereof, it will be understood by those skilled in the art that various changes in form and details may be made therein without departing from the spirit and scope of the exemplary embodiments as defined by the appended claims. The exemplary embodiments should be considered in descriptive sense only and not for purposes of limitation. Therefore, the scope of the exemplary embodiments is defined not by the detailed description of the exemplary embodiments, but by the appended claims, and all differences within the scope will be construed as being included in the exemplary embodiments.

While the aspects have been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method of communicating between a first AV device and a second AV device by establishing at least one control session and at least one data session using a peer to peer standard, the method comprising:
    receiving a request of enabling a user input back channel (UIBC), from the second AV device, using the at least one control session;
    receiving a user input; and
    transmitting information regarding the user input to the second AV device through the UIBC.

2. The method of claim 1, wherein the information regarding the user input comprises at least one of a function code for controlling the second AV device, pointing information, and character data.

3. The method of claim 1, further comprising establishing the UIBC, the establishing the UIBC comprising:
    receiving a query from the second AV device related to a UIBC capability of the first AV device;
    transmitting a response related to the UIBC capability of the first AV device to the second AV device;
    receiving a UIBC establishment request from the second AV device, using the UIBC capability of the first AV device; and
    transmitting a response related to the UIBC establishment request to the second AV device.

4. The method of claim 1, wherein the information regarding the user input is transmitted to the second AV device through the UIBC using at least one of a real-time streaming protocol (RTSP), a real-time transport protocol (RTP), Bluetooth, Zigbee, and digital living network association (DLNA).

5. The method of claim 1, further comprising establishing the UIBC, the establishing the UIBC comprising:
    transmitting a query about UIBC capability of the second AV device to the second AV device;
    receiving, from the second AV device, a response related to the UIBC capability of the second AV device;
    transmitting a UIBC establishment request to the second AV device using the UIBC capability of the second AV device; and
    receiving a response related to the UIBC establishment request from the second AV device.

6. The method of claim 1, further comprising:
    establishing the UIBC,
    wherein the establishing the UIBC comprises setting up the at least one data session of the UIBC by using the at least one control session, and
    wherein the transmitting the information regarding the user input comprises transmitting data about the user input through the at least one data session of the UIBC.

7. The method of claim 6, wherein the transmitting of the information regarding the user input further comprises transmitting control information regarding the user input through the control session.

8. The method of claim 6, wherein the transmitting of the information regarding the user input further comprises transmitting control information regarding the user input through a digital living network association (DLNA) session.

9. The method of claim 1, further comprising notifying a disablement of the UIBC to the second AV device.

10. The method of claim 1, wherein the first AV device comprises a sink device and the second AV device comprises a source device.

11. A first AV device configured to communicate with a second AV device by establishing at least one control session and at least one data session using a peer to peer standard, the first AV device comprising:
    a user input receiver configured to receive a user input; and
    a communicator configured to:
        receive a request of enabling a user input back channel (UIBC), from the second AV device, using the at least one control session; and
        transmit information regarding the user input to the second AV device through the UIBC.

12. The first AV device of claim 11, further comprising a controller configured to set up the at least one data session of the UIBC using the at least one control session,
    wherein the communicator is further configured to transmit information regarding the user input through the data session of the UIBC.

13. The first AV device of claim 12, wherein the communicator is further configured to transmit information regarding the user input through the control session.

14. A method of communicating between a first AV device and a second AV device by establishing at least one control session and at least one data session using a peer to peer standard, the method comprising:
    transmitting a request of enabling a user input back channel (UIBC), to the first AV device, using the at least one control session; and
    receiving information regarding a user input from the first AV device through the UIBC.

15. The method of claim 14, wherein the information regarding the user input comprises at least one of a function code for controlling the second AV device, pointing information, and character data.

16. The method of claim 14, wherein the first AV device comprises a sink device and the second AV device comprises a source device.

17. The method of claim 14, further comprising establishing the UIBC, wherein the establishing the UIBC comprises:
    transmitting a query related to a UIBC capability of the first AV device to the first AV device;
    receiving a response related to the UIBC capability of the first AV device from the first AV device;

transmitting a UIBC establishment request to the first AV device, using the UIBC capability of the first AV device; and receiving a response related to the UIBC establishing request from the first AV device.

18. The method of claim 17, wherein the information regarding the user input is transmitted to the second AV device through the UIBC using at least one of a real-time streaming protocol (RTSP), a real-time transport protocol (RTP), Bluetooth, Zigbee, and digital living network association (DLNA).

19. The method of claim 14, further comprising establishing the UIBC, wherein the establishing the UIBC comprises:
receiving a query related to a UIBC capability of the second AV device from the first AV device;
transmitting a response related to the UIBC capability of the second AV device to the first AV device;
receiving a UIBC establishment request from the first AV device using the UIBC capability of the second AV device; and
transmitting a response related to the UIBC establishment request to the first AV device.

20. The method of claim 19, wherein the information regarding the user input is transmitted to the second AV device through the UIBC using at least one of a real-time streaming protocol (RTSP), a real-time transport protocol (RTP), Bluetooth, Zigbee, and digital living network association (DLNA).

21. The method of claim 14, wherein the receiving of the information regarding the user input comprises receiving data and control information regarding the user input through the control session.

22. The method of claim 14, further comprising establishing the UIBC,
wherein the establishing the UIBC comprises setting up a data session of the UIBC by using the control session, and
wherein the receiving of the information regarding the user input comprises receiving data related to the user input through the data session of the UIBC.

23. The method of claim 22, wherein the receiving of the information regarding the user input further comprises receiving control information regarding the user input through the control session.

24. The method of claim 14, further comprising:
transmitting a UIBC disable request to the first AV device; and
receiving a response related to the UIBC disable request from the first AV device.

25. A second AV device configured to communicate with a first AV device by establishing at least one control session and at least one data session using a peer to peer standard, the second AV device comprising:
a communicator configured to:
transmit a request to enable a user input back channel (UIBC), to the first AV device, using the at least one control session, and
to receive information regarding a user input from the first AV device through the UIBC.

26. The second AV device of claim 25, wherein the communicator is further configured to receive data and information regarding the user input through the control session.

27. The second AV device of claim 25, further comprising a controller configured to set up the at least one control session and the at least one data session with the first AV device, and to establish the UIBC using the at least one control session,
wherein the communicator is further configured t receive information regarding the user input through data session of the UIBC.

28. The second AV device of claim 27, wherein the communicator is further configured to receive information regarding the user input through the at least one control session.

29. The second AV device of claim 25, wherein the second AV device comprises a source device and the first AV device comprises a sink device.

* * * * *